455-296 SR
FIP8106 XR 3,670,275

United States Patent [15] 3,670,275
Kalliomaki et al. [45] June 13, 1972

[54] ELECTRONIC AND AUTOMATIC SELECTOR DEVICE CONNECTED TO AN ANTENNA ARRAY FORMED BY TWO OR MORE ANTENNAS

[72] Inventors: Kalevi Juhani Kalliomaki, Oulu; Martti Eelis Tiuri, Tapiola; Seppo Matti Vakkila, Helsinki, all of Finland

[73] Assignee: Vaisala Oy, Vantaa, Finland

[22] Filed: April 14, 1970

[21] Appl. No.: 28,408

[52] U.S. Cl. ..............................325/370, 325/303, 343/205
[51] Int. Cl. ..............................H04b 7/08
[58] Field of Search ....................325/56, 303, 304, 306, 366, 325/370, 372; 328/137; 343/205, 206

[56] References Cited

UNITED STATES PATENTS

| | | | |
|---|---|---|---|
| 3,537,011 | 10/1970 | Escoula | 325/370 X |
| 3,329,901 | 7/1967 | Case | 325/370 |
| 3,095,538 | 6/1963 | Silberstein | 325/370 X |
| 2,937,268 | 5/1960 | Downie et al. | 325/370 |
| 3,401,340 | 9/1968 | Cronburg, Jr. et al. | 325/304 |

*Primary Examiner*—Benedict V. Safourek
*Attorney*—Richards & Geier

[57] ABSTRACT

An electronic automatic selecting device has an antenna array consisting of two or more antennas pointing in different directions for the purpose of selecting and connecting to a service receiver that antenna from which the desired radio signal is best obtained. The selection is carried out by a selecting device and a search receiver having a low frequency output, from which, when receiving a frequency modulated emission, a noise signal is obtained proportional to the S/N ratio of the signal received by the receiver. This signal steers the selecting device. In accordance with the present invention the selecting device includes a noise handling unit the input of which receives the noise voltage from the search receiver and the output of which is large when the search receiver receives a signal with a poor S/N ratio and small when the search receiver receives a signal with a good S/N ratio. There is a voltage-to-frequency converter the operating frequency of which is determined by the output voltage of the noise handling circuit, whereby the output frequency is high when the output voltage is large and is low when the output voltage is small, a pulse oscillator which oscillates at a constant frequency and which gives the search command, an electronic change-over switch which upon receiving the search command from the pulse oscillator, sequentially connects, steered by the voltage-to-frequency converter, the antennas of the antenna array to the search receiver, and which after sampling all antennas returns to zero. There is also a circuit for comparing the signals obtained from the various antennas to the input of which are fed the pulses from the voltage-to-frequency converter and the output of which produces a pulse when during a search cycle an antenna giving a signal with a better S/N ratio than any other antenna previously sampled during the search cycle is connected to the search receiver, and a memory circuit to the input of which is fed from a dividing circuit constituting a part of said electronic change-over switch, the number in binary form of each of the antennas connected to said search receiver during the search cycle. This binary number moves to the output of the memory circuit only when an output pulse is obtained from the signals comparing circuit. Finally there is an electronic switch controlled by said memory circuit and connecting the service receiver to that antenna of the antenna array from which the search receiver during the search cycle has received the signal with the best S/N ratio.

11 Claims, 2 Drawing Figures

PATENTED JUN 13 1972

3,670,275

SHEET 1 OF 2

INVENTORS:
K.J. Kalliomäki, M.E. Tiuri and S.M. Vakkila
By Richards & Geier
ATTORNEYS INVENTORS:
K.J. Kalliomäki, M.E. Tiuri and S.M. Vakkila
BY Richards & Geier
ATTORNEYS

ELECTRONIC AND AUTOMATIC SELECTOR DEVICE CONNECTED TO AN ANTENNA ARRAY FORMED BY TWO OR MORE ANTENNAS

This invention concerns an electronic and automatic selector device which, from an antenna array formed by two or more antennas pointing in different directions, chooses, and connects to a receiver, that antenna by which the desired radio signal is best received.

Many applications of radio communications, such as satellite communications, and frequently also mobile land and sea communications, require the use of antennas with high gain and narrow radiation patterns. Such antennas then require to be pointed in the direction of the opposite station. This pointing may be performed either mechanically or electrically, in the latter case by suitable phasing the elements of the antenna array while the antennas are stationary. If completely automatic reception and tracking are desired both solutions are expensive and difficult to realize. They have the further disadvantage that at any given time, a signal may be received from only one direction. A third method is to use several fixed high gain antennas pointed in various directions and to connect to the receiver that antenna by which the desired radio signal is received. The following may be mentioned — the receiver is not always unconditionally connected to the best antenna, because the device in question incorporates a fixed, pre-adjusted threshold level — reception ceases during search — in the case of a weak signal the search will continue even after all the antennas have been sampled once, and the device connects the receiver to the best antenna only on the second search cycle — the antenna device is rather sensitive to interference.

The selecting device according to the present invention does not have the above mentioned drawbacks.

The invention will now be explained in detail with reference to an example of application where the signal emitted by a satellite moving in the whole half-space is received at a fixed ground station. The attached drawings will be referred to, where:

Figure 1:
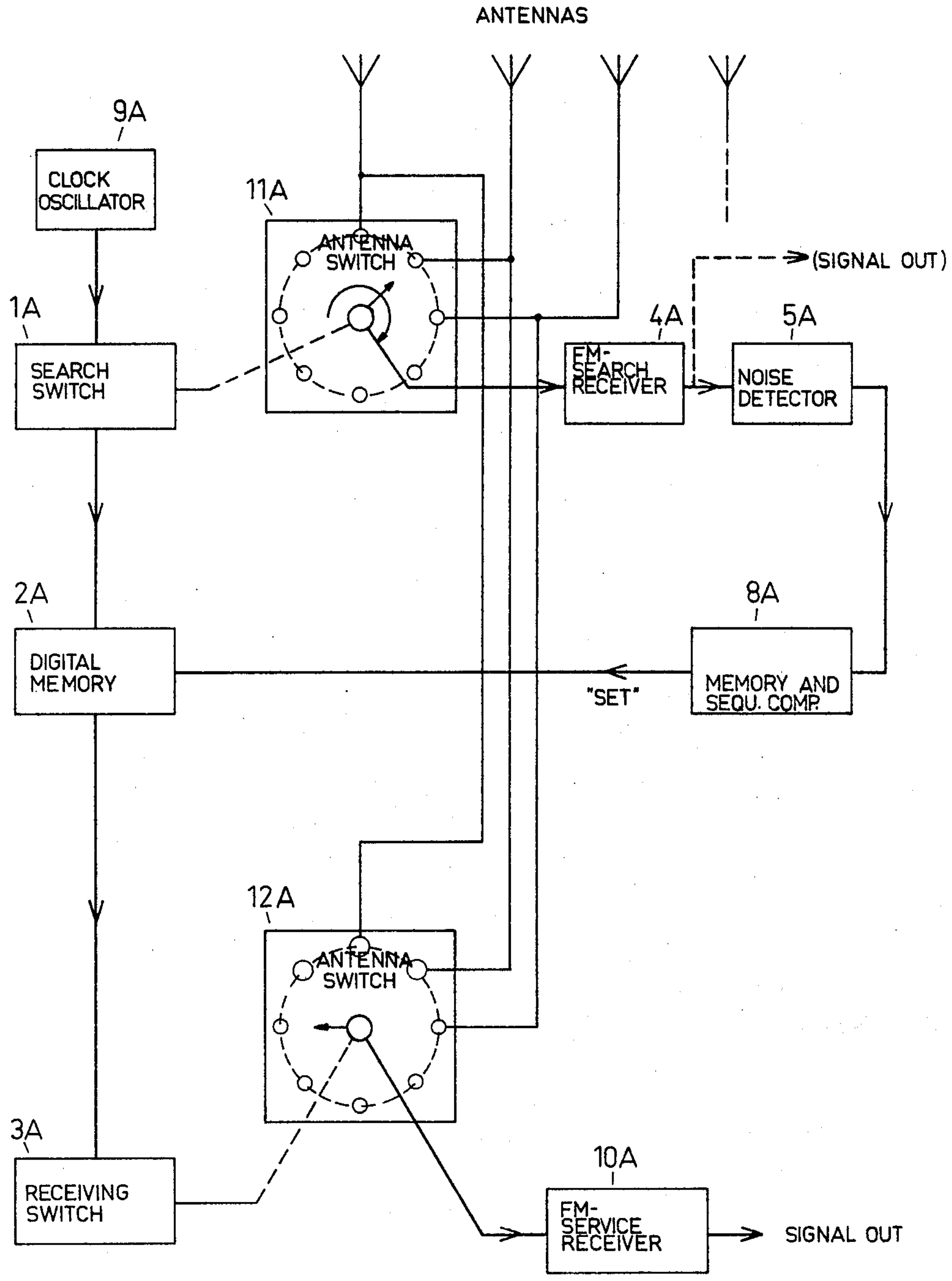
FIG. 1 is a simplified block diagram representation of the selecting device according to the invention.

According to FIG. 1, there is a continuously cycling antenna switch, 11A. The cycling is produced by a clock oscillator 9A, by mediation of the search switch 1A.

The antenna switch 11A connects antennas, one after the other, to the FM-search receiver 4A. From the output signal of FM-search receiver 4A the signal carrying information is removed by means of the noise detector 5A, whereby a voltage proportional to the signal/noise ratio is left. This voltage is supplied to the memory and sequential comparator 8A, which compares mutually, in turn, the signal/noise ratios from the different antennas. When the most favorable antenna is connected, the sequential comparator and memory 8A gives the "SET" order to the digital memory 2A, whereby the momentary position of the search switch 1A is transferred to the receiving switch 3A and antenna switch 12A and is maintained there unless a better antenna is found. Hereby the FM-service receiver 10A always is connected to the most favorable antenna.

Figure 2:
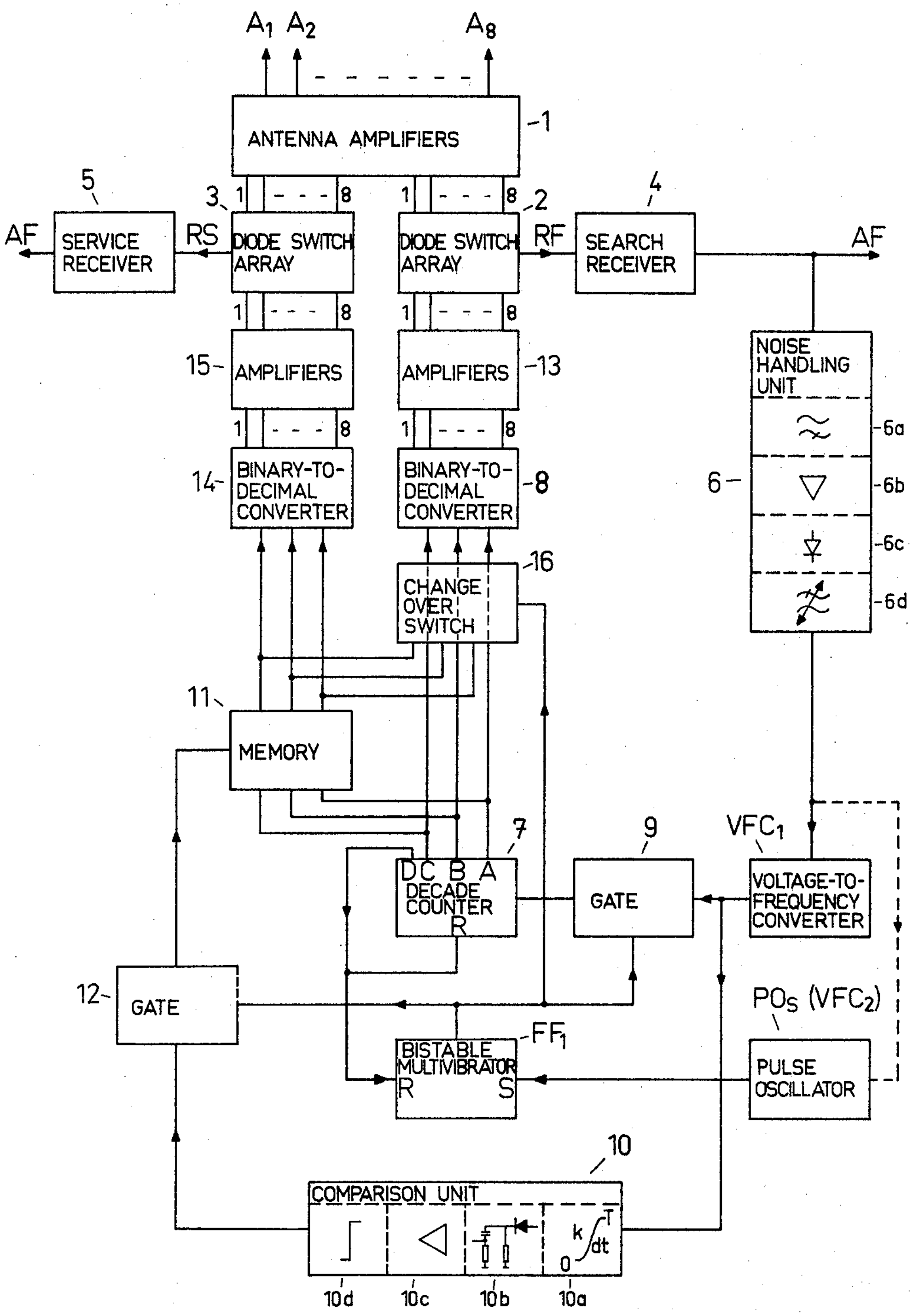
FIG. 2 is a detailed block diagram.

With reference to FIG. 2 it is assumed that it is desired to receive a frequency-modulated signal emitted at a frequency of 136.950 MHz, e.g., by a weather satellite, at a ground station, the antenna array of which comprises eight antennas, marked with the reference numbers $A_1 ... A_8$, and pointed in different directions. To each antenna an antenna amplifier is connected, the antenna amplifiers have been collectively marked with the reference number 1. The output of each antenna amplifier is connected to two diode switch arrays 2 and 3. The output of the diode switch array 2 is connected to the input of the search receiver 4 and the output of the diode switch array 3 is connected to the input of the actual service receiver 5. To the low frequency output of the search receiver 4 is connected a noise handling unit 6, which contains a high pass filter 6*a*, the lower cutoff frequency of which is the same as the highest modulation frequency, an amplifier 6*b*, a linear rectifier 6*c*, and a low pass filter 6*d*, which has a nonlinearly voltage-dependent time constant. This voltage which is obtained from the noise handling unit 6, and which is inversely proportioned to the signal-to-noise ratio (S/N) of the signal incident on the input, will in the following be referred to as the steering voltage and is used to perform the antenna selection. In the following will be explained the way of performing this selection, and how the device according to the present invention is used to dispose of the aforementioned disadvantages.

ESTABLISHING THE SIGNAL SEARCH CYCLE.

The steering voltage obtained from the noise handling unit 6 controls the voltage-to-frequency converter $VFC_1$. The suitable value for the working frequency of $VFC_1$ is, e.g., in the case of a weather satellite, 1–100 Hz, depending on the noise voltage, 1 Hz corresponding to a good signal, 10 Hz to a poor signal and 100 Hz to zero signal. These values require that $VFC_1$ exhibits a nonlinear characteristic, which can be achieved in many previously known ways. The purpose of $VFC_1$ is to give the actual pulses performing the switching of antennas. The purpose of the pulse oscillator $PO_s$ is to give, with suitable intervals, the command to search for a better signal. A suitable working frequency for the pulse oscillator $PO_s$ is, in the case of weather satellites, about 0.1 Hz.

The search command is directed from the pulse oscillator POs to a bistable multivibrator $FF_1$, acting as a memory, which changes state when excited by a pulse; its output voltage then changes from state 0 to state 1. Then the gate 9 opens, connecting the pulses from $VFC_1$ to an electronic change-over switch (7, 8, 13, 2), which sequentially connects antennas $A_1$, $A_2 ... A_8$ of the antenna array to the receiver 4. The electronic change-over switch may be realized e.g., according to FIG. 1 with one decade counter 7, the corresponding binary-to-decimal converter 8, the amplifiers 13, and the diode switch array 2. When the change-over switch (7, 8, 13, 2) has sampled all antennas $A_1 ... A_8$, $FF_1$ and the change-over switch are returned to the quiescent state by a reset pulse, which is obtained from the change-over switch itself; in the case of FIG. 1 this pulse is obtained from the output D of the decade counter 7, and it is fed to the R-terminals of decade counter 7 and $FF_1$, so that the output of $FF_1$ changes from state 1 to state 0 and the outputs A, B, C, D of the decade counter 7 are all zeroed.

COMPARING THE SIGNALS OBTAINED FROM THE DIFFERENT ANTENNAS.

To find, from the antenna array, that antenna from which the desired radio signal is best obtained, it is necessary somehow to compare the signals obtained from the various antennas. The steering voltage obtained from the noise handling unit 6, being inversely proportional to the signal voltage, is of course a measure of the S/N-ratio of the signal. Since the voltage in question is at its smallest when the signal is at its strongest, and since it is furthermore noisy, it is not used directly in the signal comparison unit 10, instead the inverse of the aforementioned steering voltage is formed, i.e., a voltage proportional to the signal strength is generated. Thus larger voltages may be compared, which simplifies the construction of the comparison unit 10.

As was explained above, the working frequency of $VFC_1$ is proportional to the aforementioned steering voltage, which is derived from the noise. Since frequency and period are inverses of each other, it can immediately be stated that the time interval between pulses of $VFC_1$, T, is proportional to the S/N-ratio of the received signal. This can easily be converted to a voltage by integrating a constant voltage over the time interval in question, T. Then the final value of the output voltage of the integration is a voltage directly proportional to the received signal. The only noise component left in the output voltage of the integrator is due to the random variations of the period T, and coherent with the frequency noise of $VFC_1$. This coherence is important, since $VFC_1$ changes antennas after a time T. If the steering voltage obtained from the noise mentioned earlier were used as the comparison voltage, it would have to be filtered by integrating just over the time T to decrease the alternating component of the steering voltage. This would mean using duplicate circuits, since $VFC_1$ performs just the required integration (integrating voltage-to-frequency converter).

The voltage proportional to the signal, and obtained from the circuit 10, which integrates a constant voltage over time T, is conducted to the signal comparator (10*b*, 10*c*, 10*d*), which receives, in sequence, voltages proportional to the signals received by the various antenna elements. These voltages should be intercompared, the largest selected and the number of the corresponding antenna stored in a memory. A possible method would be the use of parallel memory circuits for storing the voltages given by the various antennas. Then a rather complicated comparison circuit and logic for the antenna numbers would be needed. A simpler selecting circuit will be achieved by using a sequential comparator, i.e., it is determined whether some antenna, An, gives a larger signal than the best of the previously sampled antennas $A_1 \ldots A_{n-1}$. If this is the case, the number of the antenna in question is stored in the memory. The number of the antenna is obtained directly, in binary form, from the dividing circuit 7 of the electronic change-over switch (7, 8, 13, 2), since the comparison in the sequential comparator takes place when the antenna in question is connected to the receiver 4, i.e., simultaneously. In this way needless storage of antenna numbers is avoided, of the sampled antennas only the number of the best one is stored in the memory 11, the number previously stored in the memory 11 being erased at the instant when the new number is inserted. In this connection it must be noted that, when the search cycle begins, the comparison voltage is a voltage proportional to the signal given at the beginning of the search cycle by the best antenna found in the previous search cycle, so that the numbers of weak antennas possibly occurring at the beginning of the search cycle are not stored in the memory 11, and such antennas are also not connected to the service receiver 5. This is achieved by interposing a change-over switch 16 between the decade counter 7 and the binary-to-decimal converter 8. During the search cycle the change-over switch 16, controlled by $FF_1$, connects the decade counter 7 belonging to the electronic change-over switch (7, 8, 13, 2) directly to the corresponding binary-to-decimal converter 8, i.e., the change-over switch 16 does not influence the search cycle described above. During the "quiet" time between search cycles the change-over switch 16 also connects the number stored in the memory 11 to the electronic switch (8, 13, 2) of the search receiver 4, then the search receiver 4 is connected to the corresponding antenna, which gives the strongest signal. Since the signal comparator (10*b*, 10*c*, 10*d*) also works in the quiet time between search cycles when the search receiver 4, and also of course the service receiver 5, are connected to the best antenna of the antenna array, the holding circuit of the peak rectifier 10*b*, to be described later, retains the comparison voltage of this antenna until the beginning of the next search cycle. Proceeding in this manner, the service receiver 5 does not loose its signal practically speaking even for a moment during the search cycle, since when the service receiver 5 is connected to a new antenna, which might possibly be prescribed by the memory 11, the change-over takes place in a few micro-seconds, the switching time being dependent on the speed of the memory 11 and the electronic change-over switch (14, 5, 3). Further, the change in signal level is always significantly in a rising direction.

The voltages obtained from the integrator 10*a*, which are proportional to the signals of the various antennas, are conducted to a peak rectifier 10*b*, which acts as a sequential comparator. The time constant of the holding circuit of the peak rectifier 10*b*must be chosen large compared to the time of a search cycle. Its upper bound is determined by the highest attenuation rate of the signal from the satellite, i.e., this time constant will be of the same order of magnitude as the pulse repetition interval of $PO_s$. The discovery of a better antenna than the previous one entails a larger output voltage from the integrator 10*a*, and then the capacitor of the holding circuit of the peak rectifier 10*b* is charged. This charging is detected by transforming, with the aid of a small series resistor, the capacitor current to a voltage, which is amplified in the amplifier 10*c*, and formed into a pulse in the "Schmitt trigger" 10*d*, which instructs the memory 11 to store the number of that antenna to which the electronic change-over switch (7, 8, 13, 2) had connected the search receiver 4 at the instant of the pulse. The memory pulse from the "Schmitt trigger" 10*d* must pass the gate 12 when this is open during the search cycle only so that a change of antenna number stored in the memory 11 during the quiet time between search cycles is prevented.

THE SEARCH RECEIVER AND THE SERVICE RECEIVER.

In order for the reception not to be interrupted during the search cycle two receivers are needed, the search receiver 4 and the service receiver 5. The service receiver 5 is always connected, by the electronic change-over switch (14, 15, 3), to that antenna which gives the best signal, the number of this antenna is obtained from the memory 11. The construction of the electronic change-over switch (14, 15, 3) can be the same as that of the latter part (18, 13, 2) of the electronic change-over switch (7, 8, 13, 2) i.e., it can be constructed e.g., from a binary-to-decimal converter 14, amplifiers 15, and a diode switch array 3.

The selection device according to the invention may with the aid of a simple auxiliary logic be used in the case of several receivers tuned to different frequencies, in this case a common search receiver finds the antenna, which gives the best signal for each of the service receivers in turn. Then several different satellites may be simultaneously received with the same antenna array. Each service receiver then needs its own memory 11 and electronic switch (14, 15, 3) in the auxiliary logic. The memories may be connected in parallel as seen from the input, i.e., the decade counter 7 controls all of them simultaneously. A first auxiliary change-over switch must, however, be connected between the signal comparison unit 10 and the memories 11, and a second auxiliary change-over switch between the memories 11 and the change-over switch 16, the operation of both being synchronized with the change-over switch changing the frequency of the search receiver, in such a manner that during each search cycle any memory pulse possibly obtained from the signal comparison unit 10 is fed to that memory 11, which controls that service receiver which is tuned to the same frequency as the search receiver. Further, the second of the auxiliary change-over switches mentioned must, for a short time before the search cycle, connect to the electronic change-over switch (8, 13, 2) the number stored in the corresponding memory, so that the search receiver 4 receives the strongest signal found at the frequency in question during the previous search cycle.

Since the interruption of the signal during the search cycle is quite short (about 100 ms) the actual service receiver with its associated circuitry (14, 15, 3) is in some cases not needed at all, but one can be content with the low-frequency signal from the search receiver 4. Then it is also unnecessary to use separate preamplifiers in the antennas, since several receivers may not be connected to the same antenna. In the case of one receiver it is advantageous to replace the pulse oscillator $PO_s$ with another voltage-to-frequency converter $VFC_2$, which is also controlled by the steering voltage obtained from the noise handling unit 6. A suitable working frequency for $VFC_2$ in the case of weather satellites is about 0–0.5 Hz, where 0 corresponds to a very good signal, i.e., the receiver 4 remains continously connected to the same antenna, and needless signal interruptions are avoided. When the signal is zero the frequency of $VFC_2$ is 0.5 Hz.

It is further characteristic of the selection device according to the invention that it is insensitive to interference. This is because of the fact that the operation of the device is based on a search sequence and a quiet period. If a possible interference occurs during the quiet time, it has no influence on the operation of the device. If the search sequence lasts, e.g., 100 ms and the quiet period 10s, it is seen that the device is very insensitive to short-term interference. The tolerance of interference may easily be further increased. One way is to insert, in connection with the memory 11, a circuit which insures that the memory 11 changes its state only when the pulse from the gate 12 has indicated the same antenna as being the best, e.g., during two or three consecutive search cycles. In the case of weather satallites one may also, due to the modulation system, use a sensor for the 2,400 Hz subcarrier in such a way that, for an antenna to be considered acceptable, this subcarrier must exist in the signal.

Although the operation and construction of the selection device according to this invention has been explained in detail in connection with a certain example of its application, it is not desired to let this limit the scope of the invention, but the selection device is suitable for many uses where an antenna gain of 10–12 dB is sufficient, if the whole half-space is to be covered. If the desired coverage is smaller, then the use of the selector device according to the invention is advantageous with higher-gain antennas as well. The fact that the units of the selector device are constructed in the manner described above is also not to be construed as a limitation of the scope of the invention. The electronic change-over switch may, for example, be built in many other ways known to professionals than with a decade counter, corresponding binary-to-decimal converter, and diode switches, however, the method explained here is simple of construction and inexpensive.

We claim:

1. An electronic automatic selecting device for selecting an antenna with the best desired radio signal from an antenna array comprising a plurality of antennas pointing in different directions, two diode switch arrays connected with the antenna array, a search receiver connected with one of said diode switch arrays and having a low-frequency output producing a noise signal proportional to the S/N ratio of the received signal, and a selecting device comprising a noise handling unit having an input connected with the output of said search receiver, the output of said noise handling unit being large when said search receiver receives a signal with a poor S/N ratio and being small when said search receiver receives a signal with a good S/N ratio, a voltage-to-frequency converter connected with the output of said noise handling unit, the operating frequency of said converter being determined by the output voltage of said noise handling unit in that the output frequency is high when the output voltage is large and is low when the output voltage is small, a pulse oscillator connected in parallel with said voltage-to-frequency converter, said pulse oscillator oscillating at a constant frequency and giving the search command, a gate connected with said voltage-to-frequency converter, an electronic change-over switch connected with said gate and said one diode switch array, said change-over switch including a decade counter, means connecting said pulse oscillator to said decade counter, said change-over switch sequentially connecting the antennas of the antenna array to said search receiver and sampling the antennas, a signal comparator connected to the outlet of said voltage-to-frequency converter for comparing signals obtained from different antennas, a memory device connected with said decade counter, another gate connected with said signal comparator and said memory device, another electronic change-over switch connected with the other one of said diode switch arrays and said memory device, the output of said voltage-to-frequency converter producing a pulse when an antenna giving the best signal is connected to said search receiver, said memory device receiving a binary number from each of the antennas connected to said search receiver, the binary number moving to the output of said memory device only when an output pulse is obtained from said signal comparator, and a service receiver connected with said other diode switch array.

2. An electronic and automatic selecting device according to claim 1, characterized by the fact that the noise handling unit comprises a high-pass filter, the lower cutoff frequency of which is the highest modulation frequency, an amplifier, a linear rectifier, and a low-pass filter, the time constant of which is large for small changes of the noise voltage and small for large changes of the noise voltage, the time constant depending nonlinearly on the voltage.

3. An electronic and automatic selecting device according to claim 1, characterized by the fact that the first-mentioned electronic change-over switch is formed by said decade counter, a corresponding binary-to-decimal converter and, amplifiers.

4. An electronic and automatic selecting device according to claim 1, characterized by the fact that the signal comparator comprises an integrating circuit which integrates a constant voltage over the period time of the voltage-to-frequency converter, a peak rectifier working as a sequential comparator, an amplifier, and a pulse shaper.

5. An electronic and automatic selecting device according to claim 3, characterized by the fact that between the decade counter and the binary-to-decimal converter is inserted a change-over switch, which connects the decade counter directly to the binary-to-decimal converter during the search cycle, but which during the quiet period between search cycles connects the binary number, contained in the output of the memory circuit, to the first-mentioned electronic change-over switch of the search receiver, so that the search receiver is also connected to the corresponding antenna, which gives the strongest signal.

6. An electronic and automatic selecting device according to claim 5, characterized by the fact that the selecting device has been provided with an auxiliary logic, making it possible to use several service receivers (5), tuned to different frequencies, and one common search receiver (4), which for each service receiver in turn, seeks out that antenna which, at the respective frequency, gives the best signal, the auxiliary logic then comprises memory circuits (11) and electronic switches (14, 15, 3) for each of the service receivers (5), the decade counter (7) controlling all memory circuits (11) simultaneously, a first auxiliary change-over switch between the signal comparison unit (10) and the memory circuits (11), a second auxiliary change-over switch between the memory circuits (11) and the change-over switch (16) between the decade counter (7) and the binary-to-decimal converter (8), the operation of both of these auxiliary change-over switches being synchronized to the change-over switch changing the frequency of the search receiver (4), in such a manner that the memory pulse possibly received during each search cycle from the signal comparison unit (10) is fed to that memory (11), which controls that service receiver, which is tuned to the same frequency as the search receiver, it being then necessary for the second auxiliary change-over switch to connect, for a short time prior to the search cycle, the number contained in the corresponding memory (11) to the electronic switch (8, 13, 2), so that the search receiver receives the strongest signal found at the frequency in question during the previous search cycle.

7. An electronic and automatic selecting device according to patent claim 5, characterized by the fact that the search receiver (4) is also used as the service receiver (5), the electronic switch (14, 15, 3) will then not be needed, but the pulse oscillator (POs) is replaced with another voltage-to-frequency converter ($VFC_2$), which is controlled by the noide handling circuit (6) in such manner that when the receiver (4) receives a signal with a good S/N-ratio, the second voltage-to-frequency converter ($VFC_2$) does not oscillate, and the receiver stays connected to the corresponding antenna, avoiding needless interruptions of the signal, but when the signal deteriorates the second voltage-to-frequency converter ($VFC_2$) oscillates at a relatively small frequency, giving search commands to the electronic change-over switch (7, 8, 13, 2).

8. An electronic and automatic selecting device according to claim 7, characterized by the fact that, in order to increase the noise immunity of the selecting device, the memory circuit (11) has been augmented by a circuit, which ensures that the memory (11) changes its state only when the pulse from the signal comparison unit (10) has indicated the same antenna as being the best one during, e.g., two or three search cycles.

9. An electronic and automatic selecting device which, in connection with reception of a frequency modulated transmission, from an antenna array formed by two or more antennas pointing in different directions selects, and connects to the actual service receiver (5), that antenna from which the desired radio signal is best obtained, while to the same antenna array is further connected, for the purpose of selecting the correct antenna, with the aid of a selecting device, a search receiver (4), this selecting device comprising a. first switching means ($VFC_1$, $PO_s$, 9, 7, 16, 8, 13, 2), which connect different antennas to the search receiver (4), one at a time;
b. a noise handling unit (6), the input of which is connected to the output of the search receiver (4) and which filters off the signal and of the noise remaining outside the information band forms a control voltage proportional to the signal/noise ratio of the signal received;
c. a memory and sequential comparison unit ($VEC_1$, 10), to the input of which the said control voltage is supplied and from the output of which an order pulse is obtained whenever the control voltage, while a given antenna is connected to the search receiver (4), presents a signal/noise ratio which is superior to those of the antennas previously sampled;
d. a memory circuit (11), to the input of which the information specifying the position of the first switching means is supplied, and to the output of which said information is always transferred when the sequential comparison unit gives the order pulse;
e. second switching means (11, 14, 15, 3), which connect the service receiver (5) to the antenna specified by the output of the memory circuit (11), whereby the service receiver (5) will always be connected to the antenna giving the best signal/noise ratio.

10. An electronic and automatic selecting device according to claim 9, in which the first switching means ($VFC_1$, $PO_s$, 7, 8, 13, 2, 9, 16) are formed by a decade counter (7), a corresponding binary-to-decimal converter (8), amplifiers (13), a diode switch array (2), a voltage-to-frequency converter ($VFC_1$), a pulse oscillator ($PO_s$), a gate (9) and a selector switch (16).

11. An electronic and automatic selecting device according to claim 9, in which the memory and sequential comparison unit ($VEC_1$, 10) comprises a voltage-to-frequency converter ($VEC_1$), a peak rectifier (**10*b*) operating as a sequential comparator, an amplifier (10*c*), and a pulse shaper (10*d***).

* * * * *